(12) United States Patent
Kaminski

(10) Patent No.: US 6,239,747 B1
(45) Date of Patent: May 29, 2001

(54) ANTENNA SYSTEM AND METHOD FOR DIRECTION FINDING

(75) Inventor: Walter Joseph Kaminski, Morris, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/265,982

(22) Filed: Mar. 11, 1999

(51) Int. Cl.[7] ....................................................... G01S 5/02
(52) U.S. Cl. ........................ 342/442; 342/147; 342/157; 342/368; 342/417; 342/444; 342/445
(58) Field of Search ..................................... 342/147, 156, 342/351, 417, 418–449, 450, 157, 368–377

(56) References Cited

U.S. PATENT DOCUMENTS

| 939,477 | 2/1976 | Green et al. | |
|---|---|---|---|
| 5,745,078 | * 4/1998 | Baghdady | 342/446 |
| 5,995,046 | * 11/1999 | Belcher et al. | 342/450 |

FOREIGN PATENT DOCUMENTS 591867    9/1947 (GB).

OTHER PUBLICATIONS

H. Alex Romanowitz, "Electrical Fundamentals and Circuit Analysis", pp. 629–631; John Wiley & Sons; New York; 1966.

P.J.D. Gething, "Radio direction-finding and the resolution of multicomponent wave-fields", pp. 159–173; Peregrinus Ltd.; Oxford, UK; 1978.

* cited by examiner

Primary Examiner—Bernarr E. Gregory

(57) ABSTRACT

An array antenna for direction-finding includes antenna elements which define a triangular outline well-suited for meeting space constraints or reducing reflections from mounting conditions associated with the array antenna. The actual geometric configuration of the antenna elements is limited to certain triangular configurations with corresponding geometric correction factors to maintain the accuracy of estimating the angle of arrival. A processing system determines the appropriate angle of arrival based upon differential phases received in the antenna elements and the appropriate geometric correction factor.

27 Claims, 7 Drawing Sheets

| AOA 224 | δ₀° 200 | δ₉₀° 202 |
|---|---|---|
| \multicolumn{3}{c}{3-PHASE TO 2-PHASE DF SYSTEM} | | |
| 0 | 0 | -180 |
| 15 | 47 | -174 |
| 30 | 90 | -156 |
| 45 | 127 | -127 |
| 60 | 156 | -90 |
| 75 | 174 | -47 |
| 90 | 180 | 0 |
| 105 | 174 | 47 |
| 120 | 156 | 90 |
| 135 | 127 | 127 |
| 150 | 90 | 156 |
| 165 | 47 | 174 |
| 180 | 0 | 180 |
| 195 | -47 | 174 |
| 210 | -90 | 156 |
| 225 | -127 | 127 |
| 240 | -156 | 90 |
| 255 | -174 | 47 |
| 270 | -180 | 0 |
| 285 | -174 | -47 |
| 300 | -156 | -90 |
| 315 | -127 | -127 |
| 330 | -90 | -156 |
| 345 | -47 | -174 |
| 360 | 0 | -180 |

ELECTRICAL PHASE FOR D=1/2 WAVELENGTH
226

228 — Az ANGLE (DEG)

—— δ₀°
—— δ₉₀°

ANTENNA SYSTEM AND METHOD FOR DIRECTION FINDING

FIELD OF INVENTION

The invention relates to an antenna system and method for direction finding.

BACKGROUND ART

Array antennas for direction finding are used to estimate the location of a source of an electromagnetic signal. An Adcock array antenna arranges four antenna elements in an orthogonal pattern for direction finding. For example, a cross is an orthogonal pattern in which each arm of the cross may be defined by two antenna elements. Typically, the antenna elements of an array antenna for direction-finding are mounted to a metallic structure, such as a tower. The tower may reflect the electromagnetic signal before or after it reaches the array antenna causing inaccuracies in measurements associated with the direction of the source of the electromagnetic signal. The electromagnetic signal may be modeled as an electromagnetic field or as a planar wavefront incident upon the antenna. Any other metallic objects in the vicinity of the antenna may perturb the electromagnetic field; hence, degrade the accuracy of direction finding. Thus, a need exists for reducing or eliminating the influence of unwanted reflections from surrounding metallic objects on a direction-finding antenna.

A direction-finding antenna is frequently used in applications where space conservation is of paramount importance. Aesthetic appearance of a direction-finding antenna may be facilitated by disguising the antenna to meet local zoning ordinances or contractual leasing requirements of an antenna site. Even where aesthetic appearance does not, in effect, limit size of the antenna, available space at a crowded antenna site or building roof-top may limit the practical maximum antenna size. Therefore, the direction-finding antenna may need to fit a particular volume constraint or an area constraint for mounting on a building, a tower, a monopole, a vehicle, or an airplane.

Wireless communication systems are expected to incorporate location-determining equipment, such as direction-finding antennas because of emergency "911" service, public safety, and law enforcement concerns. As cellular networks operate side-by-side with personal communication service networks on different frequency bands, person communication service infrastructure costs may be reduced by sharing existing cellular sites. Yet, the full benefit of sharing such infrastructure costs may only be realized with the availability of dual-band products. Thus, a need exists for a dual-band antenna for operation within the cellular band and the newer personal communication service (PCS) bands within the U.S. In addition, similar dual-band antennas are needed for the European cellular band and the newer personal communication network (PCN) in Europe.

SUMMARY OF THE INVENTION

In accordance with the invention, an array antenna for direction finding of received signals includes antenna elements. The antenna elements are arranged to define a triangular outline. The separations between the antenna elements are determined based upon a frequency band of operation. Phase-measuring devices (e.g., correlators) are coupled to the antenna elements for measuring differential phases of signals received between different pairs of the antenna elements. A processing system determines an angle of arrival of an electromagnetic field incident upon the antenna elements, based upon the measured differential phases and a geometric correction factor associated with the actual relationship existing between the antenna elements.

In one aspect of the invention, an array antenna includes antenna elements which define an adjustable triangular outline that may be adjusted to meet space constraints or reduce reflections from mounting conditions associated with the array antenna. The adjustment of the antenna elements is limited to certain geometric configurations with corresponding geometric correction factors to maintain the accuracy of estimating the angle of arrival.

In another aspect of the invention, a compact dual-band array antenna advantageously has common antenna elements which are shared between a first frequency band and a second frequency band. The common antenna elements and adjustable geometry are well-suited for mounting in a spatially confined area or economically serving multiple frequency bands from a single antenna site.

DETAILED DESCRIPTION OF THE PREFERRED EMBODIMENT

Figure 1:
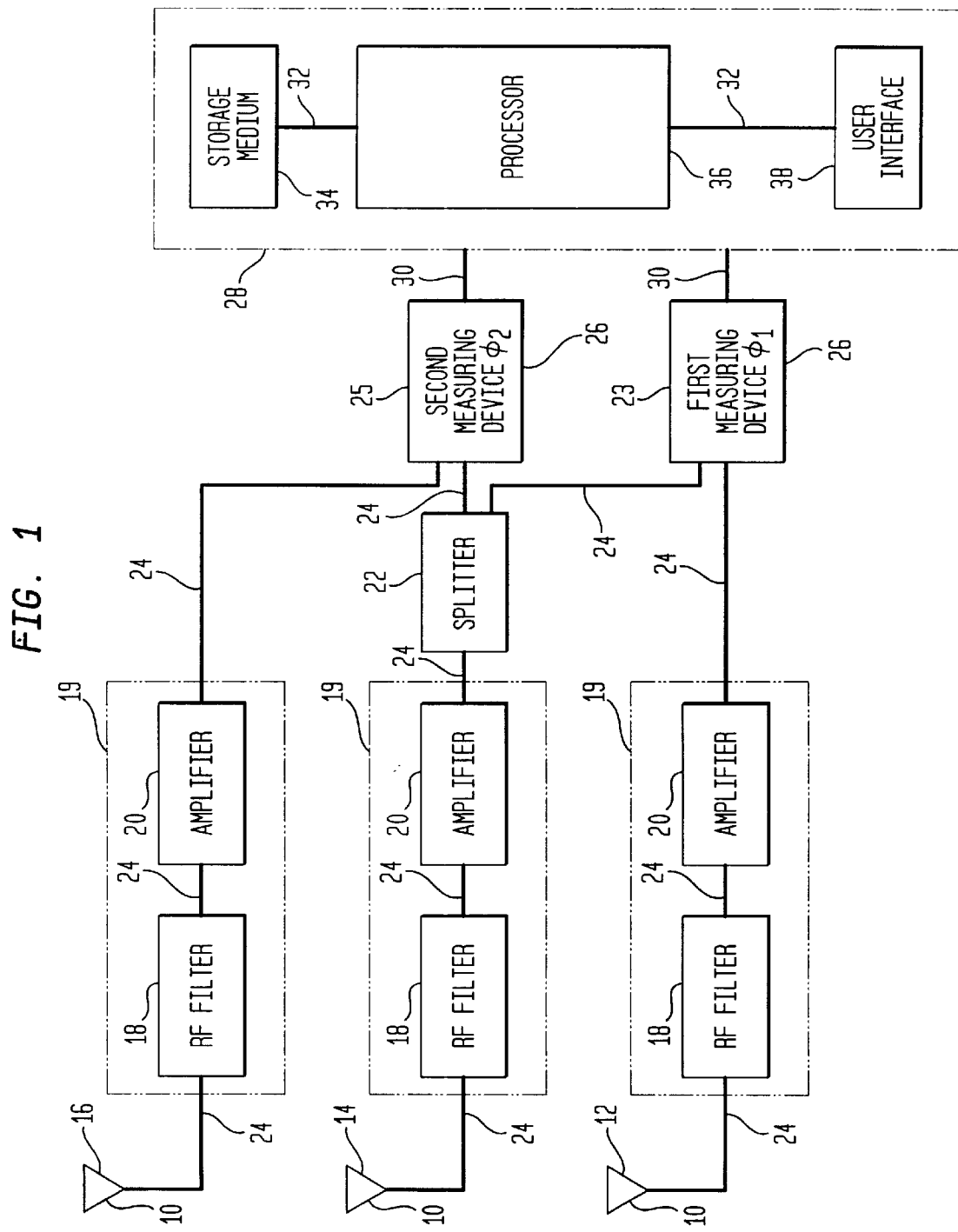
FIG. 1 is a block diagram of an array antenna system for determining an angle of arrival in accordance with the invention.

In accordance with the invention, FIG. 1 show the components of an array antenna system for determining the angle of arrival of a field of electromagnetic energy incident upon the array antenna system. The array antenna system includes antenna elements 10 that are coupled to measuring devices 26 for measuring differential phase through intermediate radio frequency assemblies 19. Each intermediate radio frequency assembly 19 preferably includes at least a combination of a radio frequency filter 18 coupled to an amplifier 20. Transmission media 24 provides a signal path between each antenna element 10 and its corresponding intermediate radio frequency assembly 19. The transmission media 24 also provides a signal path between each measuring device 26 and at least one intermediate radio frequency assembly 19. A signal splitter 22 is interconnected to multiple measuring devices 26 to distribute the radio frequency signal received at an antenna element to multiple measuring device 26. The measuring devices 26 are coupled to a processing system 28 for determining the angle of arrival of an incident field of electromagnetic energy.

Each measuring device 26 is adapted to measure differential phases received between different pairs of the antenna elements 10. The measuring device 26 for measuring differential phase may comprise a correlator, a phase comparator, a phase-measuring device using a double-balanced mixer, a 90 degree hybrid, and a power divider, an I/Q (inphase/quadrature) network device, or any other suitable phase-measuring device. The measuring device 26 accepts input signals from different antenna elements 10 and provides an output signal indicative of the differential phase between the input signals. The measuring devices 26 are coupled to a processing system 28 for calculating an angle of arrival of an electromagnetic field incident upon the antenna elements 10. In an alternate embodiment, the measuring device 26 uses acoustic wave surface technology, such as a lithium niabate or lithium tantalate crystalline material to measure phase.

The processing system 28 includes a user interface 38 for entering processing instructions based on a geometric configuration of the array antenna system, a processor 26 for executing the instructions, and a storage medium 34 for storing information output form the processor 36. Databus 32 provides a conduit for the transfer of information among the processor 36, the user interface 38, and the storage medium 34.

Although the processing system.28 may comprise a general purpose computer, in an alternate embodiment the processing system 28 may comprise any electronic hardware adapted to provide a visual display of the azimuth angle of arrival. For example, if the measuring device 26 includes a phase comparator using a double-balanced mixer, the processing system 28 may comprise an oscilloscope with inputs for two signals. The oscilloscope is arranged to display the angle of arrival as a dot or a vector on a polar coordinate system on the oscilloscope display, with the position of the dot or vector indicating the differential phase between the input signals.

Figure 2:
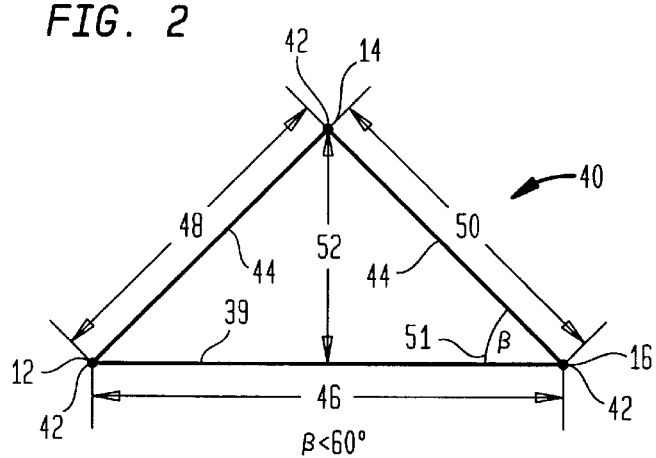
FIG. 2 through FIG. 4 shows top plan views of various possible geometric configurations of the array antenna system of FIG. 1.
Figure 3:
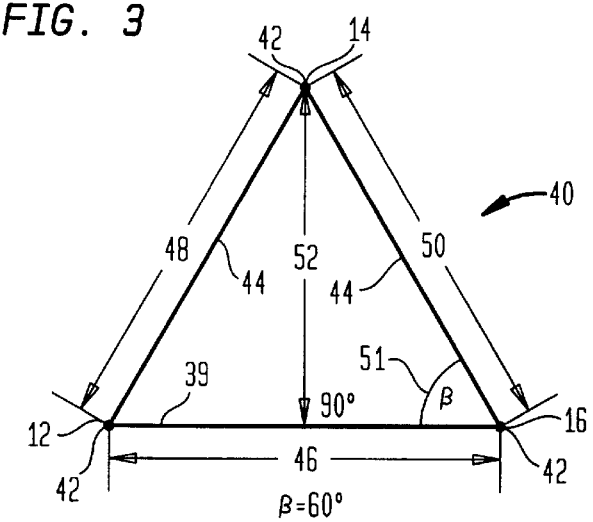
Figure 4:
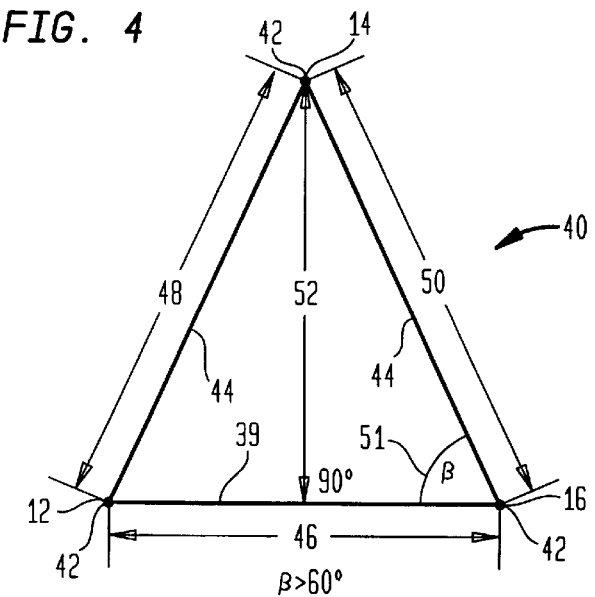

As best shown in FIG. 2 through FIG. 4, the antenna elements 10 define vertices 42 of a triangular outline 40 in a plane. The triangular outline 40 may be shaped as an equilateral triangle, an isosceles triangle, or a right triangle. In practice, the triangular outline 40 is preferably located in a horizontal plane so as to be able to discern an azimuth angle of an incident electromagnetic field. The triangular outline 40 includes sides 44 coextensive with corresponding separations between the antenna elements 10. The separations between the antenna elements 10 are determined based upon a frequency band of operation.

The processing system 28 is programmed, or otherwise configured, to determine an angle of arrival of an electromagnetic wavefront incident upon the antenna elements 10. The user interface 38 permits a user to select one of a group of potential geometric relationships of the antenna elements 10, such as those geometric relationships shown in FIG. 2–FIG. 4, as an actual relationship existing between the antenna elements 10 such that the processing system 28 can select an appropriate geometric correction factor corresponding to the actual geometric relationship. The user changes a previous geometric correction factor to an updated geometric correction factor upon alteration or reconfiguration of the triangular outline. Therefore, in accordance with the invention, the antenna elements 10 may be realigned in a triangular outline to reduce or eliminate the deleterious effects of unwanted near-field reflections of electromagnetic energy. In addition, the antenna elements 10 may be realigned in various different triangular outlines to meet spatial constraints or mounting limitations.

In an alternate embodiment, the user interface 10 could be replaced by sensors that communicate with the processing system 28 to indicate the relative positions of the antenna elements 10 without human input.

A processor 36 within the processing system 28 then determines the angle of arrival of the electromagnetic field based upon the differential phases from the measuring device 26 and a geometric correction factor associated with the actual relationship existing between the antenna elements 10. In particular, the processor 36 is generally programmed for executing one or more equations, for accessing a lookup table, or for accessing a relational database to estimate the angle of arrival with due consideration of the actual geometric relationship of the antenna elements 10. Accordingly, the permissible parameters of the actual geometric relationship of the antenna elements 10 and various illustrative examples of equations for finding the angle of arrival are presented in more detail hereafter.

More specifically, the array antenna system shown in FIG. 1 works in the following manner to determine an angle of arrival of an electromagnetic field incident upon the array antenna. The field of electromagnetic energy induces radio frequency electrical signals in corresponding antenna elements 10. Phases of the induced electrical signals differ between pairs of the antenna elements 10 in relation to the angle of arrival of the electromagnetic field. Each RF filter 18 reduces interference from out-of-band electrical signals induced in a corresponding antenna element 10. After filtering, each RF amplifier 20 amplifies the electrical signals and routes the amplified electrical signals to a corresponding measuring device 26.

The measuring devices 26 generally include a first measuring device 23 and a second measuring device 25. The first measuring device 23 is adapted to measure a first phase differential associated with a first signal from a first antenna element 12 and a second signal from a second antenna element 14. The second measuring device 25 is adapted to measure a second phase differential between the second signal from the second antenna element 14 and a third signal from a third antenna element 16. The second antenna element 14 is associated with a splitter 22 such that the second signal may be distributed to both the first measuring device 23 and the second measuring device 25.

A processing system 28 is arranged to communication with the first measuring device 23 and the second measuring device 25. The processing system 28 evaluates the first phase differential and the second phase differential in accordance with a geometric configuration of the array antenna to determine a direction of arrival of an electromagnetic wavefront incident upon the antenna elements 10.

Referring to FIG. 1 through FIG. 4, the antenna elements 10 include a first antenna element 12, a second antenna element 14, and a third antenna element 16. The actual geometric relationship between the antenna elements 10 is defined by a first separation 46 between the first antenna element 12 and the third antenna element 16, a second separation 48 between the first antenna element 12 and the second antenna element 14, and the third separation 50 between the second antenna element 14 and the third antenna element 16.

The actual geometric relationship corresponds to a geometric correction factor. The geometric correction factor bears on the calculation of the second phase component ($\delta_{90}$), as opposed to the first phase component ($\delta_0$). As used herein, the second phase component and the first phase component represent mathematical functions of a first differential phase and a second differential phase, wherein the measuring devices 26 are adapted to measure the first differential phase and the second differential phase. In accordance with the embodiment shown in FIG. 1, the processing system 28 necessarily calculates the second phase component and the first phase component, rather than measuring the second phase component and the first phase component directly from the direction-finding antenna. Advantageously, the calculation of the second phase component and first phase component permits the use of as little as three antenna elements 10 to provide an accurate basis for calculating the angle of arrival of an electromagnetic field.

The geometric correction factor may be determined by at least two different methods. In a first method, the geometric correction factor equals a ratio between a height distance 52 and a length of the base side 39 of the triangular outline 40 (FIG. 2–FIG. 4). The height distance 52 is measured from an apex of two adjacent sides 44 of the triangular outline 40 to a base side 39 opposite the apex. The base side 39 is coextensive with the first separation 46 between the first antenna element 12 and the third antenna element 16. The adjacent sides 44 may be equal in length to each other and coextensive with the second separation 48 and the third separation 50.

In a second method, the geometric correction factor may be calculated by measuring a beta angle 51, between the base side 39 and an adjacent side 44 of the triangular outline 40. That is, the adjacent side 44 coextensive with the third [] separation 50 and the base side 39 form a beta angle 51. After measuring the beta angle 51, the geometric correction factor may be obtained by solving an equation dependent upon the beta angle 51: $x = 0.5 \sin \beta / \sin(90° - \beta)$, wherein $\beta$ is the beta angle. The geometric correction factor establishes an appropriate mathematical relationship between the angle of arrival (of the electromagnetic field incident upon the antenna elements) and the differential phases measured between the different pairs of the antenna elements 10. Although the geometric factor may be mathematically determined by geometric analysis of the actual relationship between the antenna elements 10, empirical measurements can be used to determine the geometric correction factor or to confirm a mathematical solution.

Each of the antenna elements 10 generally comprises a dipole or a monopole. Each antenna element 10 preferably has an omni-directional radiation pattern in a horizontal plane, corresponding to a torroidal (i.e. donut-shaped) pattern in three dimensions. Each antenna element preferably has a sufficiently high impedance to avoid disrupting the electromagnetic field associated with an electromagnetic field that might distort the received angle of arrival from the true angle of arrival. Accordingly, the dimensions of dipole elements may be made thinner to increase impedance as necessary. If the impedance of the antenna elements 10 does not match the characteristic impedance of the transmission lines or other components to which the antenna elements 10 are coupled, a transformer (not shown) may be used for matching as is well-known to those skilled in the art. In a preferred embodiment, the antenna elements 10 are preferably arranged in a symmetrical triangular array, as opposed to a right (i.e. orthogonal) triangular array, to provide maximum phase difference between adjacent antenna elements 10. The maximum phase difference between adjacent antenna elements 10 is realized where each side of an equilateral triangular outline approaches one-half wavelength over the operational frequency band. Accordingly, the resolution of the detected azimuth angle (i.e. angle of arrival) is improved by realizing the maximum phase difference between adjacent antenna elements 10.

Each antenna element is preferably coupled to a radio frequency (RF) filter 18. The RF filter 18 generally comprises a filter that reduces interference on frequencies outside an intended operational frequency range of the antenna system. The RF filter 18 preferably comprises a bandpass filter 18 that passes the operational frequency range of the antenna system. In an alternative embodiment, the RF filter 18 comprises a high-pass filter that attenuates frequencies lower than the operational frequency range.

The RF amplifier 20 amplifies a signal sufficiently such that the measuring device 26 can produce accurate results. Each RF amplifier 20 is associated with a different antenna element 10. Each RF amplifier 20 generally introduces a known amount of phase delay in a frequency range of operation to facilitate comparison of differential phases in the measuring z-devices 26. In a preferred embodiment, all of the RF amplifiers 20 are set to have approximately identical gain and approximately identical phase delay characteristics for the corresponding antenna elements 10 to further simplify comparison of differential phases in the measuring devices 26.

The transmission media 24 generally comprises any suitable radio frequency transmission line. For example, the transmission line may comprise coaxial cable, twin-lead, microstrip, waveguide, stripline or any other suitable transmission medium with suitable velocity factor, characteristic impedance, and loss characteristics.

The phase relationships between the antenna elements 10 are influenced by the separation between the antennas as well as the electrical lengths of the transmission media 24 between the antenna elements 10 and the measuring device 26. In addition, the phase relationships between the antenna elements 10 are influenced by the intermediate assemblies 19 located in the signal path between an antenna elements 10 and the corresponding measuring device 26.

The transmission media 24 associated with different antenna elements 10 are generally of suitable electrical length to produce known phase relationships between the antenna elements 10. In a preferred embodiment, each transmission medium, associated with each signal path from the antenna element to a corresponding measuring device 26, has an approximately equal electrical length to produce equivalent phase delays.

Each measuring device 26 generally measures a phase differential between two input signals of the same frequency a range and produces an output indicative of the differential phase.

Each measuring device 26 has measuring inputs and a measuring output. The measuring inputs are coupled to the antenna elements 10 via the intermediate assemblies 19. The measuring output is preferably connected to the processing system 28 via a databus 32. While the measuring may provide a digital measuring output signal or an analog measuring output signal, a digital measuring output signal is preferred so as to render any analog-to-digital converter unnecessary at the measuring output. In practice, a universal asynchronous receiver-transmitter (UART) may form an interface between the measuring output and the databus 32 associated with the processing system 28.

The measuring devices 26 include a first measuring device 23 for measuring a first differential phase of a first signal and a second signal between a first pair of the antenna elements (12,14) and a second measuring device 25 for measuring a second differential phase of the second signal and the third signal between a second pair of the antenna elements (14,16). A first measuring device 23 receives the first signal and the second signal as input from a first pair of the antenna elements (12,14), whereas the second measuring device 25 receives the second signal and the third signal as input from a second pair of the antenna elements (14,16).

In a preferred embodiment, the processing system 28 comprises a general purpose computer coupled to the measuring devices 26 via suitable data ports of the general purpose computer. The general purpose computer preferably includes a storage medium 34 for storing a database and memory coupled to the processor 36 for storing software instructions.

The processor 36 is adapted to calculate an estimated angle of arrival of an electromagnetic field incident upon the antenna elements 10 in accordance with a predefined relationship among a first differential phase from the first measuring device 23, a second differential phase from the second measuring device 25, and an estimated angle of arrival. The foregoing predefined relationship may be expressed in a first database.

The first database is preferably stored as a look-up table in the storage medium 34. An illustrative example of a look-up table contains a first field containing a mathematical function of the first and second differential phases, a second field containing a mathematical function of the first and second differential phases, and a third field containing an estimated angle of arrival. Each value of the third field may be represented by a unique combination of corresponding values of the first field and the second field. A second database is preferably used to store antenna data on the potential geometric configuration of the array antenna, look-up tables on geometric correction factors versus corresponding geometric configurations, and the like. The user interface 38 preferably allows a user to appropriately interact with the first database, the second database, or both to define an actual geometric relationship between the antenna elements 10 and a corresponding geometric correction factor to obtain an accurate estimate of the angle of arrival of an incident electromagnetic field.

So far the angle of arrival has been determined based upon accessing one or more databases. However, in another preferred embodiment, the processing system 28 determines the angle of arrival based upon the execution of one or more mathematical equations, rather than by accessing a database. Accordingly, the processor 36 generally calculates the angle of arrival based upon the equation: $\tan \alpha = \delta_0/\delta_{90}$, where $\alpha$ is the angle of arrival, $\delta_0$ is a function of the first differential phase and the second differential phase, and $\delta_{90}$ is a function of the first differential phase, the second differential phase, and the geometric correction factor. In particular, $\delta_0 = \phi_1 + \phi_2$ and $\delta_{90} = (\phi_1 - \phi_2)/2X$, where x is the geometric correction factor, $\phi_1$ is the first differential phase, and $\phi_2$ is the second differential phase. As used herein, $\delta_0$ shall be referred to as the first phase component, and $\delta_{90}$ shall be referred to as the second phase component.

The above equation, $\tan \alpha = \delta_0/\delta_{90}$, translates into the following equation, $\alpha = \tan^{-1}[2x(\phi_1+\phi_2)/(\phi_1-\phi_2)]$, after substituting the aforementioned functions for the first differential phase, the second differential phase, and the geometric correction factor. The processor 36 calculates the angle of arrival based upon the equation: $\alpha = \tan^{-1}[2x(\phi_1+\phi_2)/(\phi_1-\phi_2)]$ where $\alpha$ is the angle of arrival, $\phi_1$ is the first differential phase, $\phi_2$ is the second differential phase, and x is the geometric correction factor. The geometric correction factor is calculated as follows: $x=0.5 \sin \beta/\sin(90°-\beta)$, wherein $\beta$ is the beta angle 51 between sides 44 coextensive with the first separation 46 and the third separation 50. As best illustrated in FIG. 2 through FIG. 4, the beta angle is located between adjacent sides 44 of the triangular outline 40 to compensate for changes in the triangular outline that would otherwise distort measurement of the angle of arrival. Alternately, the geometric factor may be measured directly from the triangular outline 40 as previously described, rendering the measurement of the beta angle 51 redundant.

An angle of arrival may be represented in degrees with a zero degree axis perpendicularly intersecting a side of the triangular outline 40 between a first antenna element 12 and a third antenna element 16. By convention, the angle of arrival may be defined to fall within a range between zero degrees and three-hundred and sixty degrees. The angle of arrival may indicate, but does not necessarily indicate, an azimuth of the source of a field of electromagnetic energy relative to the antenna system. The actual source location and the angle of arrival may differ because of directionality of the source antenna among other factors. Moreover, as the electromagnetic signal radiates from the source to the array antenna, the field (e.g., ray) may be altered from its original path by reflection, diffraction, ducting, temperature inversion, multipath, and other propagational factors.

The elevation angle (e.g., down-tilt) of the incident field generally does not impact the accuracy of estimating the direction of arrival of the electromagnetic field, unless the receiving antenna elements 10 are placed outside of the transmitting main lobe or lobes of the source of the electromagnetic field. Ideally, the receiving antenna elements 10 are placed at the zero degree elevation level with respect to a source antenna that has no down-tilt.

FIG. 2 through FIG. 4 show preferred geometric configurations for the antenna elements. Although geometric configurations having right triangles may be used to practice the invention, the preferred geometric configurations of FIG. 2 through FIG. 4 use nonorthogonal triangular outlines 40 for the antenna elements.

The nonorthogonal geometric configurations are classified according to different values of a beta angle 51 of the triangular outline 40. FIG. 2 illustrates a first geometric configuration where the beta angle 51 is less than 60 degrees. FIG. 3 illustrates a second geometric configuration where the beta angle 51 is equal to 60 degrees. FIG. 4 illustrates a third geometric configuration where the beta angle 51 is greater than 60 degrees.

Regardless of the geometric configuration of FIG. 2 through FIG. 4, the correction factor may be calculated in accordance with the formula $X=0.5 \sin \beta/\sin(90°-\beta)$. X represents a ratio of a height 52 of the triangular outline 40 to the length of the first separation 46. The first separation 46 refers to the linear distance between the first antenna element 12 and the third antenna element 16. The second separation 48 refers to the distance between the first antenna element 12 and the second antenna element 14. The third separation 50 refers to the distance between the second antenna element 14 and the third antenna element 16.

The separation between adjacent antenna elements follow certain geometric configuration rules, such that the phase relationships between pairs of antenna elements are known. For example, in FIG. 2, if the beta angle 51 is less than sixty degrees, the first separation 46 is less than or equal to approximately one-half wavelength at the frequency of operation. If the beta angle 51 is less than sixty degrees, the second separation 48 and the third separation 50 are less than the first separation 46.

If space and conditions permit, the equilateral geometric configuration of FIG. 3 is preferred to the geometric configuration of FIG. 2 because the equilateral geometric configuration produces better accuracy and resolution for estimating the angle of arrival. In FIG. 3, if the beta angle 51 is generally equal to sixty degrees, the first separation 46, the second separation 48, and the third separation 50 each are equal to or less than approximately one-half wavelength at the frequency of operation.

In FIG. 4, if the beta angle 51 is greater than sixty degrees, the second separation 48 and the third separation 50 are equal to or less than approximately one-half wavelength at the frequency band of operation. If the beta angle 51 is greater than sixty degrees, the first separation 46 is less than the second separation 48 and the third separation 50.

By allowing a user to select from a group of permitted geometric configurations with slightly different locations of antenna elements, a field technician can empirically optimize the location of the antenna elements 10 to reduce reflections from nearby metallic objects that would otherwise lead to inaccuracies in the calculated angle of arrival. Only a slight displacement of an antenna element 10 by a fractional wavelength sometimes can have a significant effect on reducing unwanted reflective signals or undesired mutual electromagnetic coupling between the antenna elements.

Figure 5:
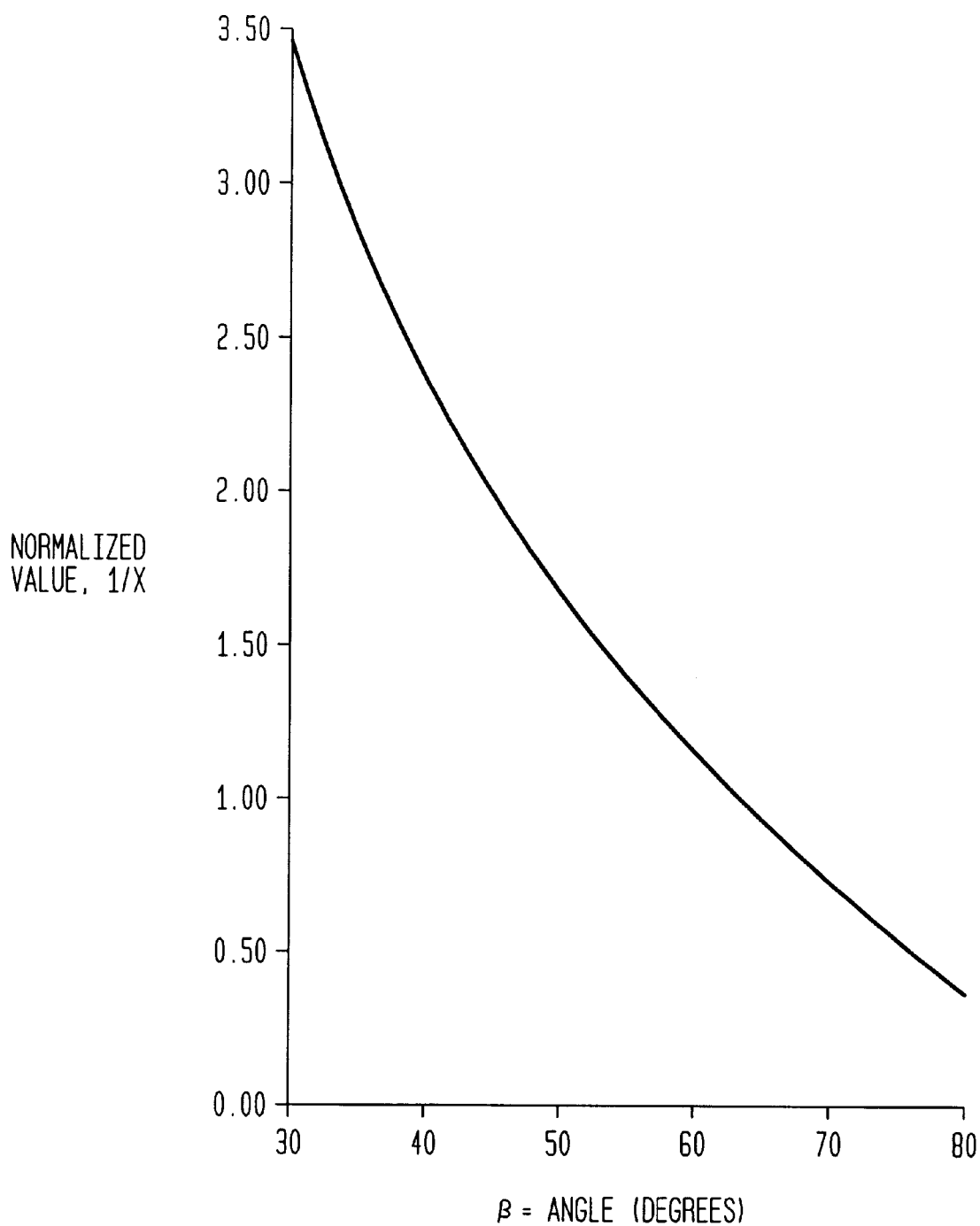
FIG. 5 shows a plot of a beta angle versus a geometric correction factor for the array antenna system of FIG. 1.

FIG. 5 shows a plot of the beta angle 51 versus the inverse of the geometric correction factor (1/x). The geometric correction factor preferably corresponds to the actual geometric configuration used. A user inputs requisite data on the actual geometric configuration so that the processor 36 is able to calculate a correct corresponding geometric correction factor. Alternately, the user may input the geometric correction factor directly into the user interface following measurement of the height 52 of the triangular outline 40.

In a preferred embodiment, the processing system 28 prompts a user for any requisite geometric data that is essential in providing an accurate geometric correction factor. The angle of arrival is calculated using the differential phases measured by measuring device 26 and the geometric correction factor. The geometric correction factor establishes an appropriate relationship between the angle of arrival and differential phases measured between different pairs of the antenna elements 10.

Figure 6:
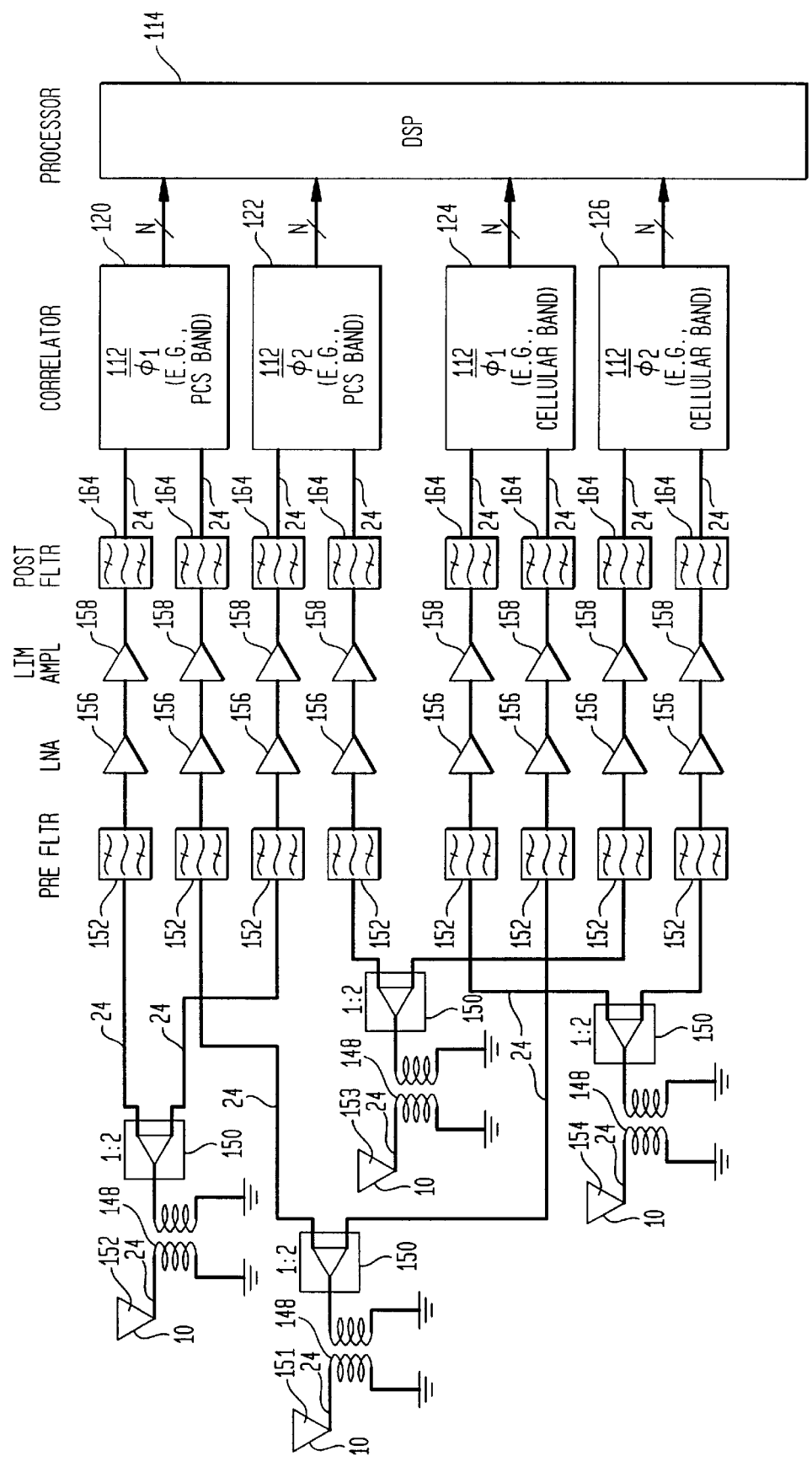
FIG. 6 is a high level block diagram of a dual-band array antenna system for determining an angle of arrival in accordance with the invention.

FIG. 6 is a block diagram of a dual-band antenna system for determining an angle of arrival of electromagnetic energy.

A dual-band antenna system for direction finding of received signals comprises a first array 100 for operating in a first frequency band and a second array 104 for operating in a second frequency band. The first array 100 includes a first antenna element 151, a second antenna element 152, and a third antenna element 153. The second array includes a fourth antenna element 154, the first antenna element 151, and the third antenna element 153.

In a preferred embodiment, the first frequency band comprises a personal communication services band, such as the frequency band from 1.8 GHz to 2 GHz. In an alternate embodiment, the first frequency band comprises a personal communications network band, such as the frequency band from 1.7 GHz to 1.8 GHz. In a preferred embodiment, the second frequency band comprises a cellular band, such as the U.S. analog cellular band from 826 MHz to 845 MHz and from 870 MHz to 890 MHz. In an alternate embodiment, the second frequency band covers a European cellular band, such as the band from 890 MHz to 989 MHz.

Figure 7:
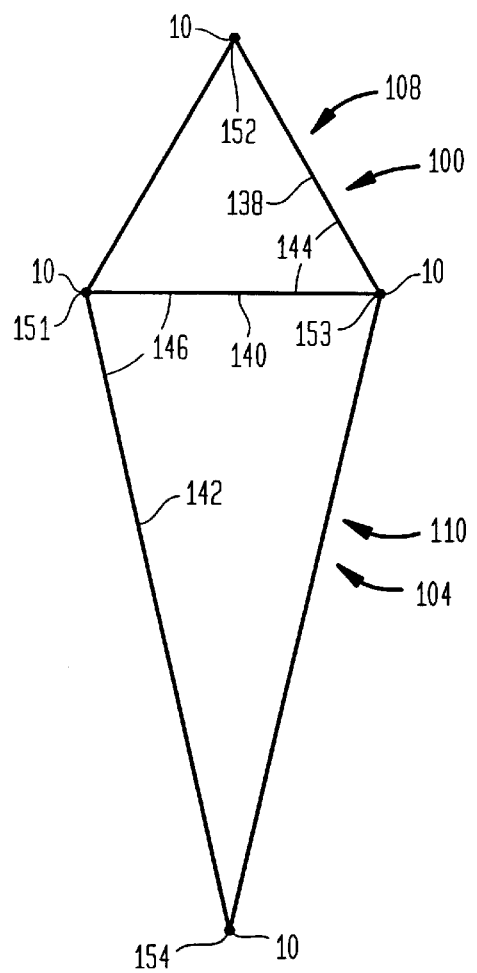
FIG. 7 shows a top plan view of one possible geometric configuration of the array antenna system of FIG. 6.

As shown in FIG. 7, the dual-band antenna system features common antenna elements (151, 153) which are shared by a first array 100 and a second array 104 to reduce antenna size and weight. In addition, the symmetrical configuration of the dual-band antenna system contributes to improved weight balance.

The first array 100 has antenna elements 10 defining first vertices of a first triangular outline 108 in a horizontal plane. The first triangular outline 108 includes sides coextensive with corresponding separations between the antenna elements 10 determined based upon the first frequency band. The second array 104 has antenna elements 10 defining second vertices of a second triangular outline 110 in a horizontal plane. The second triangular outline 110 includes sides coextensive with corresponding separations between the antenna elements 10 determined based upon the second frequency band. The second array 104 shares common ones of the antenna elements 10 with the first array 100 for serving the first frequency band and the second frequency band.

As shown in FIG. 6, an intermediate radio frequency assembly 19 is located in the signal path between each antenna element 10 and a corresponding measuring device 112. The intermediate radio frequency assembly 19 of FIG. 6 preferably includes a radio frequency transformer 148, a pre-filter 162, a low noise amplifier 156, a limiter 158, and a post filter 164.

Each antenna element 10 is coupled to an associated radio frequency transformer 148 to permit the impedance of the antenna elements 10 to be optimized. The transformer 148 has a primary with a higher impedance than a secondary. The higher impedance primary is optimally matched to the impedance of the corresponding antenna element 10. The lower impedance of the secondary is preferably matched to the characteristic impedance of the transmission line (e.g., 50 ohms). The transformer 148 enables the antenna elements 10 to have a sufficiently high input impedance such that the antenna elements 10 do not disrupt the perceived phase of the incident wavefront so as to distort phase differential measurements between pairs of the antenna elements 10. Thus, the transformer 148 prevents erroneous estimations of the angle of arrival by improving the accuracy of phase differential measurements. Suitable transformers are commercially available from Mini-Circuits, P.O. Box 350166, Brooklyn, N.Y., 11235-0003.

Each transformer 148 secondary preferably feeds a splitter 150. The splitter 150 allows each antenna element to distribute its received signal to multiple measuring devices 112. The splitter 150 may be a transformer-type splitter 150 integrated into the transformer 148. For example, such a splitter 150 may be a single torroidal transformer 148 with multiple windings to serve as an impedance matching transformer 148 and a splitter 150. In alternate embodiments, the splitter 150 may comprise a hybrid splitter, a strip-line splitter, a microstrip splitter, a three-way connector for coaxial cable, or the like. A pre-filter 162 and a post filter 164 generally comprise bandpass filters. The pre-filter 162 and post filter 164 associated with the first array 100 preferably pass the first frequency band, whereas the pre-filter 162 and the post filter 164 associated with the second array 104 preferably pass the second frequency band. The pre-filter 162 prevents the low noise amplifier 156 from amplifying extraneous radio frequency signals outside of the first frequency band or the second frequency band, which enhances the potential gain of the low noise amplifier 156. A suitable band-pass filter for the pre-filter 162 and the post filter 164 may comprise a ceramic bandpass filter, such as a 3-pole DFC series filter commercially available from muRata, Marketing Communications, 2200 Lake Park Drive, Smyrna, Ga. 30080.

A low noise amplifier 156 generally comprises any amplifier with a sufficiently low noise figure over the frequency band of operation to provide a reliable signal to the corresponding measuring device 112 and compensate for the loss introduced by any splitters or transmission media 24. The low noise amplifier 156 enhances the signal quality by increasing the signal-to-noise ratio of the received signal at the antenna system. Many commercially available broadband low noise amplifiers 156 using gallium arsenide semiconductors are suitable for the first frequency band or the second frequency band. Suitable low noise amplifier 156s are commercially available from Watkins-Johnson Company, 3333 Hillview Ave., Palo Alto, Calif. 94304.

The limiter 158 is used to adjust the amplifier output of the amplifier so that the amplified output signal is at an appropriate level for the correlator input after due consideration of any loss in the bandpass range of the post filter 164. Moreover, as the electromagnetic energy received at the dual-band array antenna may differ in intensity or amplitude, the limiter 158 appropriately prevents the amplified output signal of the limiter 158 from exceeding a correlator input maximum which could otherwise lead to inaccurate phase differential measurements or damage to the correlator circuitry. A suitable limiter 158 for the cellular band may comprise a limiting amplifier commercially available from Watkins-Johnson Company, 3333 Hillview Avenue, Palo Alto, Calif. 94304 under the designation of an LA17/SMLA17 limiting amplifier.

The measuring device 112 are capable of measuring differential phase of signals received between different pairs of the antenna elements 10. A processor 114 is instructed to determine a first angle of arrival of an electromagnetic field of the first frequency band, within an electromagnetic wavefront incident upon the antenna elements 10, based upon the differential phases from the measuring devices 112 and a first geometric correction factor associated with the first triangular outline 108. The processor 114 is adapted to determine a second angle of arrival of an electromagnetic field of the second frequency band, within an electromagnetic wavefront incident upon the antenna elements 10, based upon the differential phases from the measuring devices 112 and a second geometric correction factor associated with the second triangular outline 110.

The measuring devices 112 preferably include a first correlator 120 for measuring a first differential phase in the first array 100 between a first pair of the antenna elements (151, 152) and a second correlator 122 for measuring a second differential phase in the first array 100 between a second pair of the antenna elements (152,153). The first differential phase represents a phase difference between a first signal and a second signal associated with the first pair of antenna elements (151,152). The second differential phase represents a phase difference between the second signal and a third signal associated with the second pair (152,153) of antenna elements. The first pair and second pair have a shared antenna element.

The measuring devices 112 preferably include a third correlator 124 for measuring a third differential phase in the second array 104 between a third pair of the antenna elements (153,154) and a fourth correlator for measuring a fourth differential phase in the second array 104 between a fourth pair (151,154) of the antenna elements 10. The third differential phase represents a phase difference between a first signal and a second signal associated with the third pair of antenna elements (153,154). The fourth differential phase represents a phase difference between the second signal and a third signal associated with the fourth pair of antenna elements (151,154). The third and fourth pair have a shared antenna element. A example of a commercially available correlator which is suitable for practicing the invention is manufactured by Anaren, Inc. If a correlator is not commercially available at a frequency band of operation, a frequency converter may be used between the antenna and the correlator.

The processor 114 generally comprises a data processor, a digital signal processor, or other suitable circuitry for determining the angle of arrival from an output signal of the correlators. The processor 114 is preferably programmed to calculate the first angle of arrival based upon the equation: $\alpha_1 = \tan^{-1}[2x_1(\phi_1+\phi_2)/(\phi_1-\phi_2)]$ where $\alpha_1$ is the first angle of arrival, $\phi_1$ is the first differential phase, $\phi_2$ is the second differential phase, and $x_1$ is the first geometric correction factor. The processor 114 is preferably programmed to calculate the second angle of arrival based upon the equation: $\alpha_2 = \tan^{-1}[2x_2(\phi_3+\phi_4)/(\phi_3-\phi_4)]$ where $\alpha_2$ is the angle of arrival, $\phi_3$ is the third differential phase, $\phi_4$ is the fourth differential phase, and $x_2$ is the second geometric correction factor. The first geometric correction factor depends upon the geometry of the first array 100, while the second geometric correction factor depends upon the geometry of the second array 104. The geometries of the first array 100 and the second array 104 are largely independent from one other except for the separation between the common elements.

FIG. 7 illustrates the spatial relationships between the antenna elements 10 of the first array 100 and the second array 104 of FIG. 6. In FIG. 7, the sides of the first triangular outline 108 include a base side 140 located between the common antenna elements (151, 153). A first adjacent side 138 of the first triangular outline 108 is adjacent to the base side 140. The sides of the second triangular outline 110 include the base side 140 located between the common antenna elements (151, 153). A second adjacent side 142 of the second triangular outline 110 is adjacent to the base side 140. The base side 140 and the first adjacent side 138 form a first beta angle 144 for calculating the first geometric correction factor. The base side 140 and the second adjacent side 142 form a second beta angle 146 for calculating a second geometric correction factor.

The geometric configurations of the first triangular outline 108 and the second triangular outline 110 of FIG. 7 obey the same general rules as shown in conjunction with FIG. 2 through 4. That is, first, if the first beta angle 144 is less than 60 degrees, the base side 140 is generally equal to or less than one-half wavelength at a highest frequency of operation of the first frequency band and the second frequency band. Second, if the first beta angle 144 is equal to approximately 60 degrees, the sides of the first triangular outline 108 are at least approximately equal to each other and the sides are less than or equal to approximately one-half wavelength at the first frequency band. Third, if the second beta angle 146 is equal to approximately 60 degrees, the sides of the second triangular outline 110 are at least approximately equal to each other and the sides are less than or equal to approximately one-half wavelength at the second frequency band. Fourth, if the first beta angle 144 is greater than 60 degrees, the first adjacent side 138 of the first triangular outline 108 is equal to or less than approximately one-half wavelength at the first frequency band and an adjoining side of the first triangular outline 108 is equal to or less than approximately one-half wavelength at the first frequency band.

Although the first beta angle 144 and the second beta angle 146 may have any angular measure consistent with the foregoing description, in one illustrative example suitable for commercial sale as a PCS band—cellular band antenna, the first beta angle 144 is approximately sixty degrees and the second angle is approximately seventy-six and nine-tenths degrees. In addition, while the first adjacent side 138 and the second adjacent side 142 may have any length, in the illustrative example suitable for commercial sale as a PCS band—cellular band antenna, the first adjacent side 138 is approximately two and one-half inches long and the second adjacent side 142 is approximately five and one-half inches long.

Figure 8:
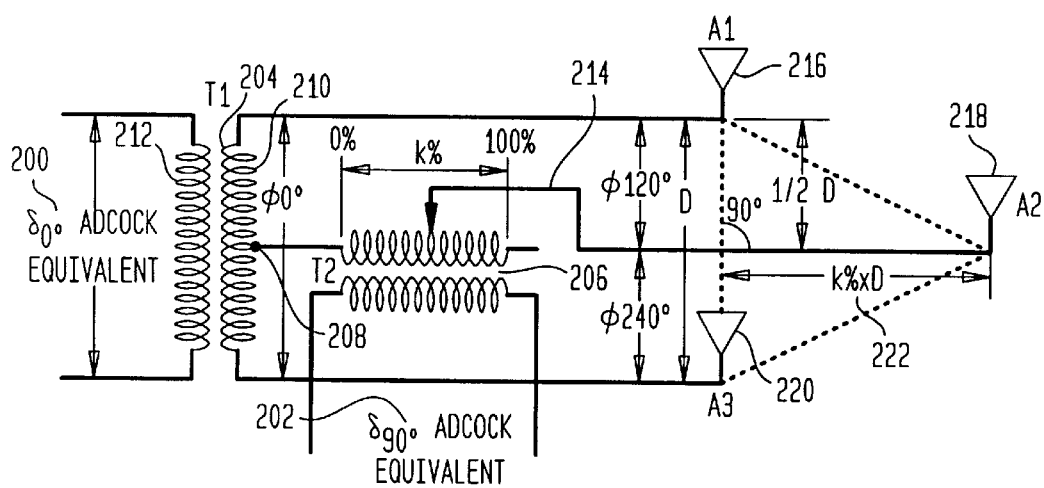
FIG. 8 shows an array antenna for determining an angle of arrival featuring a Scott-connection arrangement.

FIG. 8 shows an alternate embodiment of the array antenna of the present invention incorporating a Scott-connection transformer to interconnect the antenna elements. The Scottconnection comprises a first transformer 204 (T1) with a first tap 208 on a secondary 210 connected to a second transformer 206 (T2) or an equivalent radio frequency circuit thereof. The first transformer 204 has a 1:1 winding ratio between its primary 212 and secondary 210. The first tap 208 represents a center tap of the secondary 210 of the first transformer 204. The second transformer 206 has a second tap 214 tapped at a tap position proportional to the geometric configuration of an array antenna of any of the foregoing embodiments.

The secondary 210 of the first transformer 204 is preferably coupled to a first antenna element 216 and a third antenna element 220. The second tap 214 of the second transformer 206 is coupled to a second antenna element 218. The Scott-connection transformer advantageously produces a unique bi-phase relationship for each corresponding angle of arrival 224. The Scott-connection yields an first phase component 200 ($\delta_0$) and an second phase component 202 ($\delta_{90}$) which is orthogonal to the first phase component 200. The first phase component 200 and the second phase component 202 provide phase information from only three antenna elements which is analogous to the phase information provided by an Adcock antenna arrangement with four antenna elements.

The Scott-connection permits the direct measurement of the first phase component 200 ($\delta_0$) and the second phase component 202 ($\delta_{90}$) for the equation $\alpha = \tan^{-1}(\delta_0/\delta_{90})$. The Scott-connection may eliminate the need to use a geometric correction factor so long as the height 222 of the triangular outline has a length (k%*D in FIG. 8) commensurate with a tap ratio (k% in FIG. 8) of the Scott-connection. If the triangular outline is equilateral, the length of the height 222 represents 0.866 multiplied by a hypotenuse side of the triangular outline and the tap ratio represents 0.866. The tap ratio means that the tap must be located at 86.6 percent of the turns of the T2 transformer.

While a conventional Scott-connection is designed for 60 HZ power circuitry, in accordance with the present invention the Scott-connection comprises a radio frequency transformer for operation above 400 MHz. In contrast the conventional Scott-connection, the Scott-connection, used in conjunction with any of the foregoing embodiments of the array antennas, preferably features microstrip or a torroidal-based design.

Figures 9, 10:
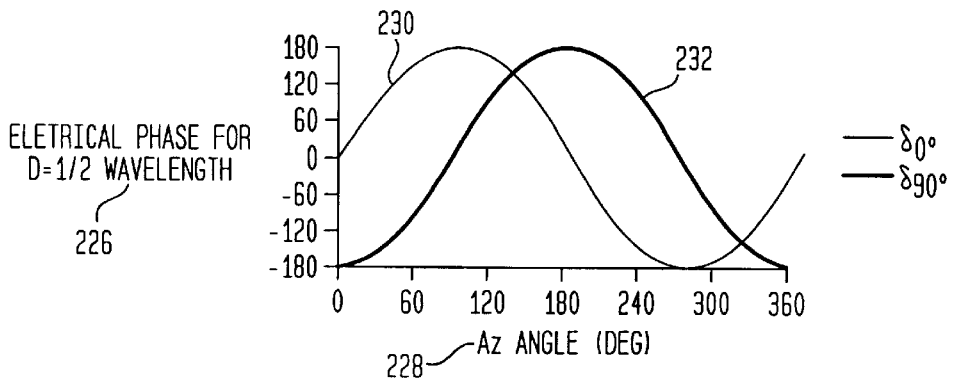
FIG. 9 is a chart showing the phase relationship versus the angle of arrival for the array antenna of FIG. 8.
FIG. 10 is a graph showing the chart of FIG. 9 in graphical form.

FIG. 9 shows a look-up table including the first phase component 200, the second phase component 202, and a corresponding angle of arrival 224. The first phase component 200 and the second phase component 202 are derived from the Scott-connection of FIG. 8. A processor may use the look-up table in conjunction with the array antenna of FIG. 8 to estimate the angle of arrival 224 of the electromagnetic radiation incident upon the array antenna.

FIG. 10 illustrates the look-up table of FIG. 9 in graphical form. The vertical axis 226 represents the differential electrical phase where the spacing between the antenna elements is one-half wavelength. The horizontal axis 228 represents the angle of arrival 224 in degrees. The light curved line represents the first phase component 200 as a first sinusoidal function 230 measured by a correlator. The dark curved line represents the second phase component 202 as a second sinusoidal function 232 measured by a correlator. The first sinusoidal function 230 is offset 90 degrees from the second sinusoidal function 232.

Figure 11:
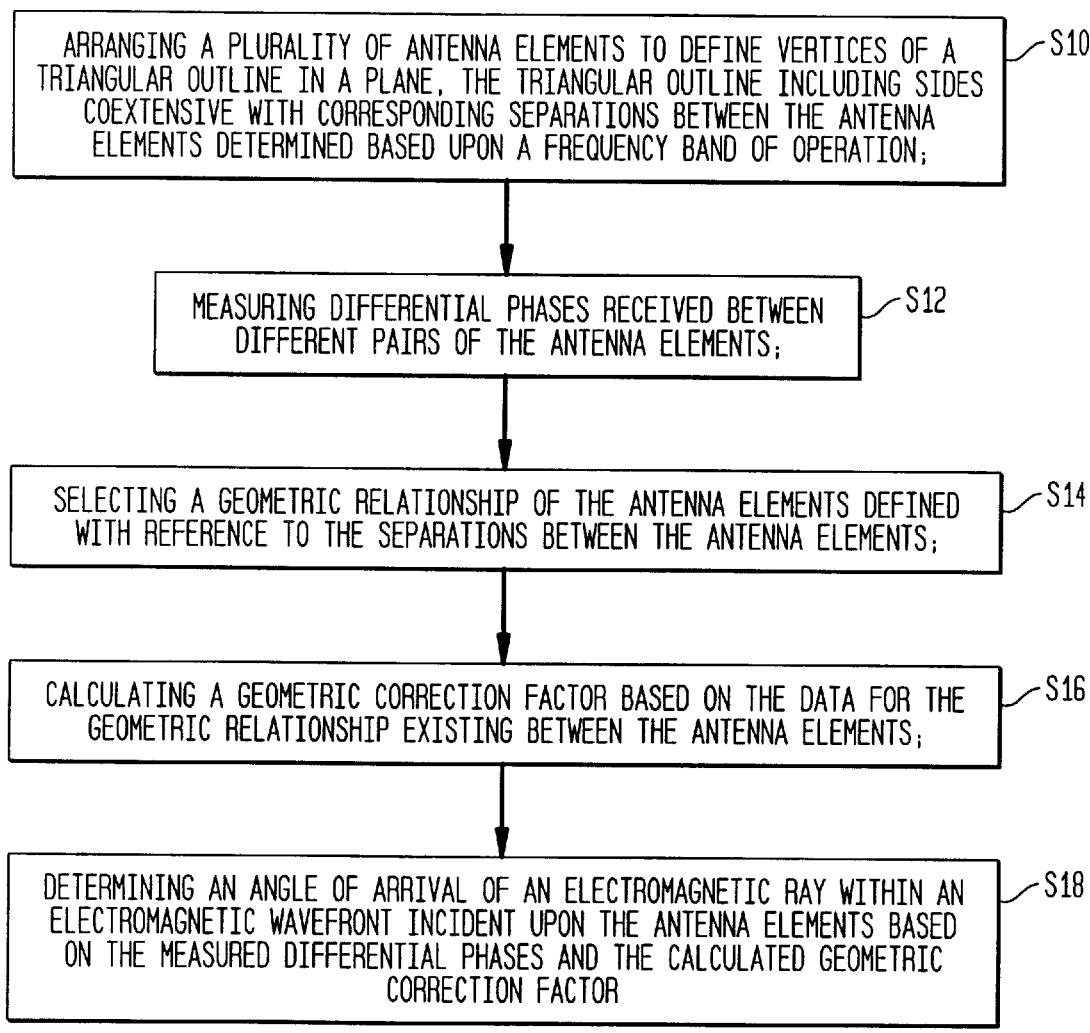
FIG. 11 is a flow chart illustrating a method of determining an angle of arrival in accordance with the invention.

FIG. 11 illustrates a method for determining an angle of arrival of a received signal at the array antenna of FIG. 1, the array antenna of FIG. 7, or any variation of the foregoing array antennas. Recall that the array antennas of FIG. 1 and FIG. 7 include processors for calculating the angle of arrival from the first differential phase and the second differential phase, measured by the measuring device 26 (e.g., correlators).

In step S10, a plurality of antenna elements 10 are arranged to define vertices of a triangular outline (e.g., triangular outline 40, first triangular outline 108, or second triangular outline 110) in a plane. The triangular outline includes sides coextensive with corresponding separations between the antenna elements 10 determined based upon a frequency band of operation.

In step S12, the measuring device (e.g., correlators) measure differential phases received between different pairs of the antenna elements 10.

In step S14, a user selects a geometric relationship of the antenna elements 10 defined with reference to the separations between the antenna elements 10.

In step S16, a processing system 28 or processor 114 calculates a geometric correction factor based on the data for the geometric relationship existing between the antenna elements. Alternately, the processing system 28 accepts a direct input of a physical measurement of the antenna representing the geometric correction factor.

In step S18, the processing system 28 or processor 114 determines an angle of arrival of an electromagnetic wavefront incident upon the antenna elements 10 based on the measured differential phases and the calculated geometric correction factor.

Step S10 may further comprise adjusting the triangular outline to meet a spatial area constraint for mounting the array antenna. For example, a triangular area encompassed by the triangular outline may be adjusted to be less than or equal to an available area for mounting the array antenna. The adjustment of the triangular outline advantageously allows the antenna to reduce or eliminate reflection of electromagnetic energy from a metallic object which would otherwise interfere with the wavefront incident upon the antenna elements 10. In some cases, the adjustment of the triangular outline permits the reduction or elimination of reflected electromagnetic energy from a tower which would otherwise interfere with the wavefront incident upon the antenna elements. The antenna elements 10 are preferably separated from the tower or another metallic object by at least one wavelength or more to reduce reflections of electromagnetic energy from the tower. In practice, the separation between the antenna elements 10 and tower may require the use of side-arms or other special mounting hardware.

In any of the foregoing embodiments of the antennas, the antenna elements are preferably provided with an adjustable mounting structure that allows adjustment of the relative locations of the antenna elements 10. Any such structure may be used to achieve one of a group of geometric relationships recognized as valid by the processor 36 or processor 114 of the antenna system. The foregoing detailed description is provided in sufficient detail to enable one of ordinary skill in the art to make and use the array antenna system for direction-finding. The foregoing detailed description is merely illustrative of several physical embodiments of the array antenna system and method. Physical variations of the array antenna and method, not fully described in the specification, are encompassed within the purview of the claims. Accordingly, the narrow descriptions of the elements in the specification should be used for general guidance rather than to unduly restrict the broader descriptions of the elements in the following claims.

What is claimed is:

1. An array antenna for direction finding of received signals, the array antenna comprising:
   a plurality of antenna elements arranged to define vertices of a triangular outline with separations between the antenna elements;
   at least one measuring device measuring differential phases between the received signals induced in at least a first pair of the antenna elements; and
   a processing system for determining an angle of arrival of an incident electromagnetic field inducing the received signals in the antenna elements, based upon the measured differential phases and a geometric relationship between the antenna elements.

2. The array antenna according to claim 1 wherein the processing system determines the angle of arrival of the incident electromagnetic field based on the measured differential phases and an angular relationship between two sides of the triangular outline, and wherein the triangular outline comprises a nonorthogonal triangle with the separations determined based upon a frequency band of operation.

3. The array antenna according to claim 1 wherein
   the processing system further comprises a user interface for selecting one geometric relationship of the antenna elements from a group of at least two geometric relationships; and
   the processing system determines the angle of arrival of the incident electromagnetic field based on the measured differential phases and the selected geometric relationship.

4. The array antenna according to claim 1 wherein the at least one measuring device includes a first correlator for measuring a first differential phase between the first pair of the antenna elements and a second correlator for measuring a second differential phase between a second pair of the antenna elements sharing a common antenna element with the first pair.

5. The array antenna according to claim 4 wherein the processing system determines the angle of arrival based upon the equation: $\alpha=\tan^{-1}(\delta_0/\delta_{90})$, where a is the angle of arrival, $\delta_0$ is a function of the first differential phase and the second differential phase, and $\delta_{90}$ is a function of the first differential phase, the second differential phase and the geometric relationship between the antenna elements.

6. The array antenna according to claim 4 wherein the processing system determines the angle of arrival based upon the equation: $\alpha=\tan^{-1}[2x(\phi_1+\phi_2)/(\phi_1-\phi_2)]$ where a is the angle of arrival, $\phi_1$ is the first differential phase, $\phi_2$ is the second differential phase, and x is a geometric correction factor indicative of the geometric relationship between the antenna elements.

7. The array antenna according to claim 4 wherein the processing system calculates the angle of arrival based upon the equation: $\alpha=\tan^{-1}[2x(\phi_1+\phi_2)/(\phi_1-\phi_2)]$ where a is the angle of arrival, $\phi_1$ is the first differential phase, $\phi_2$ is the second differential phase, and x is a geometric correction factor indicative of the geometric relationship between the antenna elements and is equal to $0.5 \sin\beta/\sin(90°-\beta)$, wherein $\beta$ is an angle between adjacent sides of the triangular outline.

8. The array antenna according to claim 1 wherein the processing system determines the angle of arrival of the incident electromagnetic field based on the measured differential phases and a geometric correction factor indicative of the geometric relationship between the antenna elements, and the geometric correction factor comprises a ratio between a height distance, measured from an apex of two adjacent sides of the triangular outline to an opposite base side, and a length of the opposite base side of the triangular outline.

9. The array antenna according to claim 1 wherein
   the processing system determines the angle of arrival of the incident electromagnetic field based on the measured differential phases and a geometric correction factor indicative of the geometric relationship between the antenna elements; and
   the antenna elements include a first antenna element, a second antenna element, and a third antenna element, a first separation between the first antenna element and the third antenna element, a second separation between the first antenna element and the second antenna element, and the third separation between the second antenna element and the third antenna element, and wherein sides coextensive with the first separation and the second separation form a beta angle for calculating the geometric correction factor.

10. The array according to claim 9 wherein
    the beta angle is greater than sixty degrees, the second separation and the third separation being equal to or less than approximately one-half wavelength at the frequency band of operation; and
    the processing system calculates the geometric correction factor based upon the equation:

$$x=0.5\ \sin\beta/\sin(90°-\beta),$$

wherein x is the geometric correction factor and $\beta$ is the beta angle.

11. The array according to claim 9 wherein
    the beta angle is generally equal to sixty degrees, the first separation, the second separation, and the third separation each being equal to or less than approximately one-half wavelength at the frequency of operation; and
    the processing system calculates the geometric correction factor based upon the equation: $x=0.5 \sin\beta/\sin(90°-\beta)$, wherein x is the geometric correction factor and $\beta$ is the beta angle.

12. The array antenna according to claim 9 wherein
    the beta angle is less than sixty degrees, the first separation being less than or equal to approximately one-half wavelength at the frequency of operation; and
    the processing system calculatesling) the geometric correction factor corresponding to the beta angle.

13. A dual-band antenna for direction finding of received signals, the antenna comprising:
    a first array for operating in a first frequency band, the first array having antenna elements arranged to define a first triangular outline with separations between the antenna elements;

a second array for operating in a second frequency band different from the first frequency band, the second array having antenna elements arranged to define a second triangular outline with separations between the antenna elements;

at least one measuring device measuring differential phases between the received signals induced in at least one pair of the antenna elements;

a processor for determining a first angle of arrival of a first electromagnetic field of the first frequency band and for determining a second angle of arrival of a second electromagnetic field within a second frequency band, based upon the measured differential phases and at least one of a first geometric correction factor indicative of a gometric relationship between the antenna elements defining the first triangular outline and a second geometric correction factor indicative of a geometric relationship between the antenna elements defining the second triangular outline, at least one of the first and second electromagnetic fields inducing the received signals in the antenna elements.

14. The dual-band antenna according to claim 13 wherein the second array shares common ones of the antenna elements with the first array for serving the first frequency band and the second frequency band.

15. The dual-band antenna according to claim 13 wherein the at least one measuring device includes a first correlator for measuring a first differential phase in the first array between a first pair of the antenna elements and a second correlator for measuring a second differential phase in the first array between a second pair of the antenna elements; and the processor calculates the first angle of arrival based upon the equation: $\alpha_1 = \tan^{-1}[2x_1(\phi_1+\phi_2)/(\phi_1-\phi_2)]$ where $\alpha_1$ is the first angle of arrival, $\phi_1$ is the first differential phase, $\phi_2$ is the second differential phase, and $x_1$ is the first geometric correction factor.

16. The dual-band antenna according to claim 15 wherein the at least one measuring device includes a third correlator for measuring a third differential phase in the second array between a third pair of the antenna elements and a fourth correlator for measuring a fourth differential phase in the second array between a fourth pair of the antenna elements; and the processor calculates the second angle of arrival based upon the equation: $\alpha_2 = \tan^{-1}[2x_2(\phi_3+\phi_4)/(\phi_3-\phi_4)]$ where $\alpha_2$ is the angle of arrival, $\phi_3$ is the third differential phase, $\phi_4$ is the fourth differential phase, and $x_2$ is the second geometric correction factor.

17. The dual-band antenna according to claim 13 wherein the separations coincide with sides including a base side located between the common ones, a first adjacent side of the first triangular outline adjacent to the base side, a second adjacent side of the second triangular outline adjacent to the base side, the base side and the first adjacent side forming a first beta angle, the first geometric correction factor being determined based on the first beta angle, and the base side and the second adjacent side forming a second beta angle, the second geometric correction factor being determined based on the second beta angle.

18. The dual-band antenna according to claim 17 wherein if the first beta angle is less than 60 degrees, the base side is generally equal to or less than one-half wavelength at a highest frequency of operation of the first frequency band and the second frequency band.

19. The dual-band antenna according to claim 17 wherein if the first beta angle is equal to approximately 60 degrees, the sides of the first triangular outline are at least approximately equal to each other and the sides are less than or equal to approximately one-half wavelength at the first frequency band.

20. The dual-band antenna according to claim 19 wherein if the second beta angle is equal to approximately 60 degrees, the sides of the second triangular outline are at least approximately equal to each other and the sides are less than or equal to approximately one-half wavelength at the second frequency band.

21. The dual-band antenna according to claim 17 wherein if the first beta angle is greater than 60 degrees, each of the first adjacent side and a remaining side of the first triangular outline is generally equal to or less than one-half wavelength at the first frequency band.

22. A method for determining an angle of arrival of a received signal at an array antenna, the method comprising the steps of:

arranging a plurality of antenna elements to define vertices of a triangular outline in a plane, the triangular outline including sides coextensive with corresponding separations between the antenna elements;

measuring differential phases received between different pairs of the antenna elements;

calculating a geometric correction factor based on a geometric relationship existing between the antenna elements;

determining an angle of arrival of an electromagnetic field incident upon the antenna elements based on the measured differential phases and the calculated geometric correction factor.

23. The method according to claim 22 wherein the arranging step further comprises adjusting the triangular outline to meet a spatial area constraint for mounting the array antenna.

24. The method according to claim 22 wherein the arranging step further comprises adjusting a triangular area encompassed by the triangular outline to be less than or equal to an available area for mounting the array antenna.

25. The method according to claim 22 wherein the arranging step further comprises adjusting the triangular outline to reduce or eliminate reflection of electromagnetic energy from a metallic object which would otherwise interfere with the field incident upon the antenna elements.

26. The method according to claim 22 wherein the arranging step further comprises adjusting the triangular outline to reduce or eliminate reflection of electromagnetic energy from a tower which would otherwise interfere with the field incident upon the antenna elements.

27. The method according to claim 22 wherein the arranging step further comprises determining the separations between the antenna elements based upon a frequency band of operation.

* * * * *